United States Patent
Park et al.

(10) Patent No.: US 8,077,561 B2
(45) Date of Patent: Dec. 13, 2011

(54) RECORDING MEDIUM, APPARATUS FOR RECORDING/REPRODUCING DATA ON/FROM THE SAME AND METHOD THEREOF

(75) Inventors: Chan Ho Park, Seoul (KR); Hyug Jin Kwon, Gyeonggi-do (KR); Sung Hoon Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 766 days.

(21) Appl. No.: 11/776,410

(22) Filed: Jul. 11, 2007

(65) Prior Publication Data

US 2008/0013438 A1    Jan. 17, 2008

(30) Foreign Application Priority Data

Jul. 11, 2006  (KR) ................ 10-2006-0064863
Nov. 24, 2006  (KR) ................ 10-2006-0116824

(51) Int. Cl.
*G11B 7/00*     (2006.01)
(52) U.S. Cl. ............... 369/30.04; 369/94; 369/275.3
(58) Field of Classification Search .............. None
See application file for complete search history.

(56) References Cited

U.S. PATENT DOCUMENTS

| | | |
|---|---|---|
| 2003/0228496 A1 | 12/2003 | Fujimaki et al. |
| 2004/0185216 A1* | 9/2004 | Hwang et al. ............ 428/64.4 |
| 2005/0013222 A1 | 1/2005 | Lee et al. |
| 2005/0047294 A1* | 3/2005 | Park ........................ 369/47.14 |
| 2005/0088945 A1 | 4/2005 | Nishiuchi et al. |
| 2005/0219979 A1 | 10/2005 | Terada et al. |
| 2006/0077879 A1 | 4/2006 | Suh |

FOREIGN PATENT DOCUMENTS

| | | |
|---|---|---|
| JP | 2004-280866 A | 10/2004 |
| WO | WO 2004/112007 A1 | 12/2004 |
| WO | WO 2005/001824 A1 | 1/2005 |
| WO | WO-2005/031719 A1 | 4/2005 |
| WO | WO 2006/031041 A2 | 3/2006 |

* cited by examiner

*Primary Examiner* — Wayne Young
*Assistant Examiner* — Brian Butcher
(74) *Attorney, Agent, or Firm* — Birch, Stewart, Kolasch & Birch, LLP

(57) ABSTRACT

A physical structure, apparatus for recording/reproducing on/from a recording medium using the same and method thereof are disclosed, by which the physical structure suitable for such a recording medium as BD and the like may be provided. The present invention includes a plurality of recording layers. Each of the recording layers includes a power test area not provided to a physically same position and a management area not provided to a physically same position, wherein a layer having the power test zone and the management area allocated consecutively includes a test area buffer allocated to the power test zone.

12 Claims, 14 Drawing Sheets

FIG. 10

| | | | | | | | |
|---|---|---|---|---|---|---|---|
| L0 | INFO3 | Angular buffer | INFO4 | | DCZ0 | | Protection zone |
| L1 | INFO3 | Angular buffer | INFO4 | | DCZ1 | | Protection zone |
| L2 | | DCZ2 | | INFO3 | Angular buffer | INFO4 | Protection zone |
| L3 | | DCZ3 | | INFO3 | Angular buffer | INFO4 | Protection zone |

FIG. 11

| | | | | | | | |
|---|---|---|---|---|---|---|---|
| L0 | INFO3 | Angular buffer | INFO4 | | DCZ0 | INFO4 | Protection zone |
| L1 | INFO3 | Angular buffer | INFO4 | | DCZ1 | INFO4 | Protection zone |
| L2 | Reserved | | | DCZ2 | INFO3 | Angular buffer | Protection zone |
| L3 | Reserved | | | DCZ3 | INFO3 | Angular buffer | Protection zone |

RECORDING MEDIUM, APPARATUS FOR RECORDING/REPRODUCING DATA ON/FROM THE SAME AND METHOD THEREOF

This application claims the benefit of the Korean Patent Application No. 10-2006-0064863, filed on Jul. 11, 2006 and the Korean Patent Application No. 10-2006-0116824 filed on Nov. 24, 2006, which is hereby incorporated by reference as if fully set forth herein.

BACKGROUND OF THE INVENTION

1. Field of the Invention

The present invention relates to a recording medium, apparatus for recording/reproducing data on/from the same and method thereof, and more particularly, to a physical structure, apparatus for recording/reproducing on/from a recording medium using the same and method thereof. Although the present invention is suitable for a wide scope of applications, it is particularly suitable for manufacturing a recording medium.

2. Discussion of the Related Art

Generally, a disc capable of recording large-size data thereon has been widely used as a recording medium. IN particular, a new high-density recording medium, e.g., Blu-ray disc (hereinafter abbreviated BD) capable of recording and storing massive high definition video data and high sound quality audio data has been recently developed.

The BD according to the next generation recording medium technology is a next generation optical recording solution having recording capability overwhelming that of the conventional DVD. So, global standards for the BD and other digital devices are being established.

However, since a preferable physical structure for the BD has not been proposed, many limitations are put on the research and development of full-scale BD-based recording/reproducing devices.

SUMMARY OF THE INVENTION

Accordingly, the present invention is directed to a recording medium, apparatus for recording/reproducing data on/from the same and method thereof that substantially obviate one or more problems due to limitations and disadvantages of the related art.

An object of the present invention is to provide a physical structure, apparatus for recording/reproducing on/from a recording medium using the same and method thereof, by which the physical structure suitable for such a recording medium as BD and the like may be provided.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a recording medium according to the present invention includes a plurality of recording layers, each including a power test zone not provided to a physically same position and a management area not provided to a physically same position, wherein a layer having the power test zone and the management area allocated consecutively includes a test area buffer allocated to the power test zone.

Preferably, each of a plurality of the recording layers of the recording medium further includes an INFO zone not recorded in the physically same position.

More preferably, the INFO zone is allocated to at least one of an inner zone of the recording medium and an outer zone of the recording medium.

In this case, in the INFO zone allocated to the inner zone, INFO zones of an $n^{th}$ recording layer and an $(n+1)^{th}$ recording layer are provided to the physically same positions, INFO zones of an $(n+2)^{th}$ recording layer and an $(n+3)^{th}$ recording layer are provided to the physically same positions, and the INFO zones of the $n^{th}$ recording layer and the $(n+1)^{th}$ recording layer are not provided to the physically same positions of the INFO zones of the $(n+2)^{th}$ recording layer and the $(n+3)^{th}$ recording layer.

And, the INFO zone of the recording medium allocated to the inner zone includes a first INFO zone (INFO1) and a second INFO zone (INFO2).

More preferably, in the INFO zone allocated to the outer zone, INFO zones of an $n^{th}$ recording layer and an $(n+1)^{th}$ recording layer are provided to the physically same positions, INFO zones of an $(n+2)^{th}$ recording layer and an $(n+3)^{th}$ recording layer are provided to the physically same positions, and the INFO zones of the $n^{th}$ recording layer and the $(n+1)^{th}$ recording layer are not provided to the physically same positions of the INFO zones of the $(n+2)^{th}$ recording layer and the $(n+3)^{th}$ recording layer.

In this case, the INFO zone of the recording medium allocated to the outer zone includes a third INFO zone (INFO3) and a fourth INFO zone (INFO4).

Preferably, the test area buffer is allocated with a size enabling tracking of the management area of the recording medium to start from the test area buffer.

More preferably, the size of the test area buffer is allocated in proportion to a recording speed.

More preferably, the test area buffer is allocated with a size over 4 physical clusters.

Preferably, the power test zone corresponds to an optimum power control area.

More preferably, the optimum power control area includes a test zone for recording a test signal.

More preferably, the optimum power control area includes a fixed number of physical clusters and wherein the test zone includes physical clusters resulting from subtracting the physical clusters configuring the test area buffer from the fixed number of the physical clusters.

More preferably, the test zone includes a fixed number of physical clusters and the optimum poser control zone includes physical clusters resulting from adding the physical clusters configuring the test zone to the physical clusters configuring the test area buffer.

Preferably, the management area includes either a temporary disc management area (TDMA) or a disc management area.

More preferably, the recording medium includes a once-recordable disc.

Preferably, the management area and the power control zone are allocated to an inner zone.

In another aspect of the present invention, a method of recording data on a recording medium, which includes a plurality of recording layers, includes the steps of reading management information from a management area allocated to each of the recording layers without being located at a physically same position, reading position information of a power test zone allocated to each of the recording layers without being located at a physically same position from the management information, and recording data on the recording medium by calculating an optimum recording power in a text zone confirmed from the read position information and by applying the calculated optimum recording power.

In another aspect of the present invention, an apparatus for recording data on a recording medium, which includes a plurality of recording layers, includes a pickup unit reading the data using a signal reflected from the recording medium, the pickup unit recording the data by applying a beam to the recording medium and a control unit controlling the data to be recorded in the recording medium in a manner of reading management information from a management area allocated to each of the recording layers without being located at a physically same position, reading position information of a power test zone not located at a physically same position from the management information, calculating an optimum recording power in a text zone confirmed from the read position information, and then applying the calculated optimum recording power.

In another aspect of the present invention, a method of reproducing data from a recording medium, which includes a plurality of recording layers, includes the steps of reading management information from a management area allocated to each of the recording layers without being located at a physically same position and the management information starts to be read from a test area buffer in the recording layer where the text zone buffer adjacent to the management area; and reproducing data recorded on a data zone based on the management information.

In another aspect of the present invention, an apparatus for reproducing data from a recording medium, which includes a plurality of recording layers, comprises a pickup unit reading the data using a signal reflected from the recording medium; and a control unit controlling the data to be reproduced from the recording medium in a manner of reading management information from a management area allocated to each of the recording layers without being located at a physically same position, the management information to be read from a test area buffer in the recording layer where the text zone buffer adjacent to the management area; and the control unit reading position information of data area from the management information.

In another aspect of the present invention, an apparatus for recording data on a recording medium, comprises a driver for driving an optical recording device to record data on the recording medium; and a controller for controlling the driver to record data in the recording medium in a manner of reading management information from a management area allocated to each of the recording layers without being located at a physically same position, reading position information of a power test area not located at a physically same position from the management information, calculating an optimum recording power in a text zone confirmed from the read position information, and then applying the calculated optimum recording power.

In another aspect of the present invention, an apparatus for reproducing data on a recording medium, comprises a driver for driving an optical reproducing device to reproduce data from the recording medium; a controller for controlling the driver to reproduce data from the recording medium in a manner of reading management information from a management area allocated to each of the recording layers without being located at a physically same position, the management information to be read from a test area buffer in the recording layer where the text zone buffer adjacent to the management area; and the control unit reading position information of data area from the management information.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 10 is a diagram of an outer zone of a recording medium according to one embodiment of the present invention;

FIG. 11 is a diagram of an outer zone of a recording medium according to one embodiment of the present invention;

DETAILED DESCRIPTION OF THE INVENTION

Figure 1:
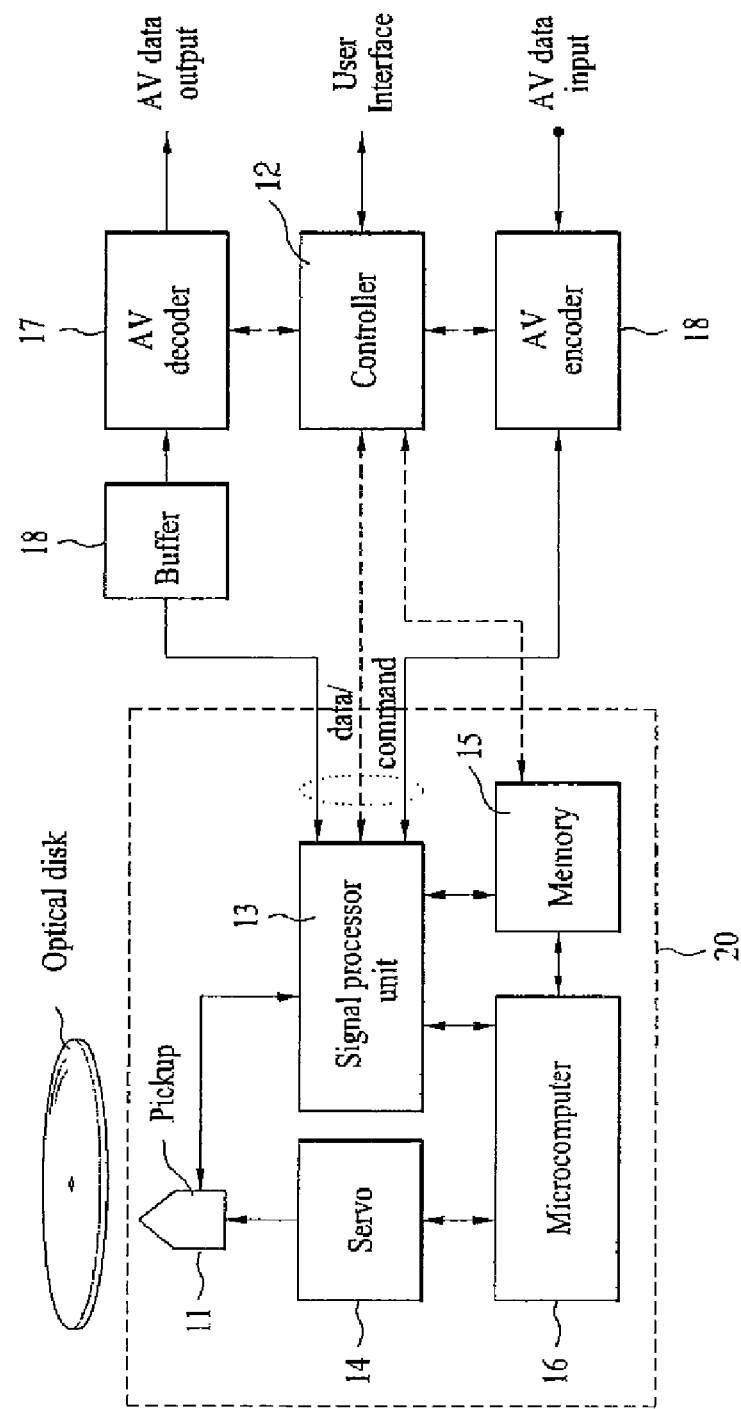
FIG. 1 is a block diagram of recording apparatus of a recording medium according to one embodiment of the present invention.

Reference will now be made in detail to the preferred embodiments of the present invention, examples of which are illustrated in the accompanying drawings. Wherever possible, the same reference numbers will be used throughout the drawings to refer to the same or like parts.

First of all, in the present invention, 'recording medium' means any kind of a medium having data recorded thereon or a data recordable medium. For example, 'recording medium' includes any kind of a medium such as a disc, magnetic tape and the like regardless of a recording system. For convenience of explanation, the present invention takes a disc, and more particularly, Blu-ray disc (BD) as a recoding medium for example. Of course, it is apparent to those skilled in the art that the technical idea of the present invention is applicable to other recording media in the same manner.

In the present invention, 'management area' means an area for recording management information of a recording medium. The management area may include a temporary disc management area (TDMA) and a disc management area (DMA). The temporary disc management area (TDMA) means an area for recording management information within a disc prior to disc closing. And, the disc management area (DMA) means an area for recording final management information in disc closing.

There exists the following relation between the TDMA and the DMA. Owing to the characteristics of the once-recordable Blu-ray disc (BD-R), general management information indicating a recording status within a disc is recorded in the TDMA together with defect management information generated in the course of using the disc. For example, once a disc is closed, it enters a non-recordable status. So, final management informations within the TDMA are transferred to the DMA to be recorded therein. Thus, management information is recorded within TDMA while a disc is used. If the disc is closed, final informations within the TDMA are transferred to be recorded in DMA. The corresponding disc is then played back using the management information within the DMA after the closing of the disc.

In the present invention, a power test area means a zone allocated for a power test in a recording medium. The power test area may be a zone allocated for performing an optimum power control (OPC) process within a recording medium. In this case, optimum power control (OPC) means a process for calculating an optimal recording power used in recording data on a recording medium.

In particular, once an optical disc is loaded in a specific optical recording/reproducing apparatus, the optical recording/reproducing apparatus calculates an optimum recording power for securing a specific reproduction quality in a manner of repeating steps of recording a signal with a specific recording power in an OPC zone within the optical disc and then reproducing the recorded signal. So, the optimum recording power determined in the above manner is utilized in recording data on the corresponding optical disc.

In the present invention, 'DCZ (drive calibration zone)' is a zone utilized by an optical recording/reproducing apparatus (or drive) within a recording medium and means a zone for enabling the optical recording/reproducing apparatus to perform various necessary tests including the OPC process. In this case, both of the OPC zone and the DCZ zone are utilizable for the OPC process.

In the present invention, 'INFO zone' means a zone that contains information associated with data exchange in a disc. In particular, in a recording medium comprising a plurality of recording layers, an inner or outer zone is able to include at least one INFO zone. For example, in case that two INFO zones exist in each of inner and outer zones of a $0^{th}$ recording layer (L0), the INFO zones existing in the inner zone are named a first INFO zone (INFO1) and a second INFO zone (INFO2), respectively and the INFO zones existing in the outer zone are named a third INFO zone (INFO3) and a fourth INFO zone (INFO4), respectively. Moreover, the INFO zone may include a DMA containing management information, a control data zone containing control information, and a PAC (physical access control) zone.

In the present invention, 'multi-layer' means a plurality of recording layers. In particular, in case that the multi-layer has a pair of recording layers, it is called 'dual layer'. In the specification of the present invention, the multi-layer has a pair of recording layers or four recording layers for example, which does not restrict the scope of the present invention.

FIG. 1 is a block diagram of a recording apparatus of a recording medium according to one embodiment of the present invention.

Referring to FIG. 1, a recording apparatus of a recording medium 10 according to one embodiment of the present invention includes a recording/reproducing unit 20 recording data on a recording medium or reproducing the recorded data from the recording medium and a controller 12 controlling the recording/reproducing unit 20.

In particular, the recording/reproducing unit 20 may include a pickup 11, a signal processing unit 13, a servo 14, a memory 15, and a microcomputer 16.

The pickup 11 directly records data on the recording medium or reads out the data recorded on the recording medium.

The signal processing unit 13 receives the data read out by the pickup 11 and then reconstructs a specific signal value from the received data. And, the signal processing unit 13 modulates a signal to be recorded into a signal to be recorded on the recording medium and then delivers the modulated signal to the pickup 11.

The servo 14 controls the pickup 11 to correctly read a signal from the recording medium or record a signal on the recording medium.

The memory 15 temporarily stores management information and data read from the recording medium, and/or control information from the controller 12 or the microcomputer 16.

And, the microcomputer 16 is responsible for controlling the above elements included in the recording/reproducing unit 20.

In aspect of reproduction, the recording/reproducing unit 20 reads data from the recording medium 30 and then provides the read data to a decoder, under the control of the controller 12. In particular, the recording/reproducing unit plays a role as a reproducing unit (or reader) for reading data.

In aspect of recording, the recording/reproducing unit plays a role as a recording unit for receiving a signal encoded by an AV encoder 18 and then recording data on the recording medium.

Besides, it is apparent to those skilled in the art that the recording/reproducing apparatus including the recording/reproducing unit 20 only may becomes a 'drive' loadable in a computer.

The recording/reproducing unit 20 plays a role in calculating an optimum recording power by performing a test in a test zone of a recording medium and also plays a role in recording the calculated optimum recording power. And, the recording/reproducing unit 20 plays a role in reading necessary data by moving the pickup 11 along with tracks of the recording medium.

The controller 12 is responsible for controlling the overall elements within the optical recording/reproducing apparatus 10. The controller 12 transfers a recording/reproducing command for recording/reproducing data on/from a recording medium to the recording/reproducing unit 20, with reference to a user command or the lie via an interface with a user. And, the controller 12 performs networking with an external server (source) by a user command or the like as well as a recording medium.

Optionally, the controller 12 and the microcomputer 16 are separated from each other to operate. Alternatively, both of the controller 12 and the microcomputer 16 are combined to work as a single control unit. In the following description, the controller 12 and/or the microcomputer 16 is called a control unit. Optionally, the control unit may be comprised of a program (software) and/or hardware provided within the optical recording/reproducing apparatus 10.

Under the control of the controller 12, the decoder 17 decodes the signal read from the recording medium, reconstructs the decoded signal into specific information, and then provides the specific information to a user. To perform a function of recording a signal on a recording medium, the encoder 18 converts an input signal into a specific format, e.g., to MPEG2 transport stream and then provides the signal to the signal processing unit 13, under the control of the controller 12.

Figure 2:
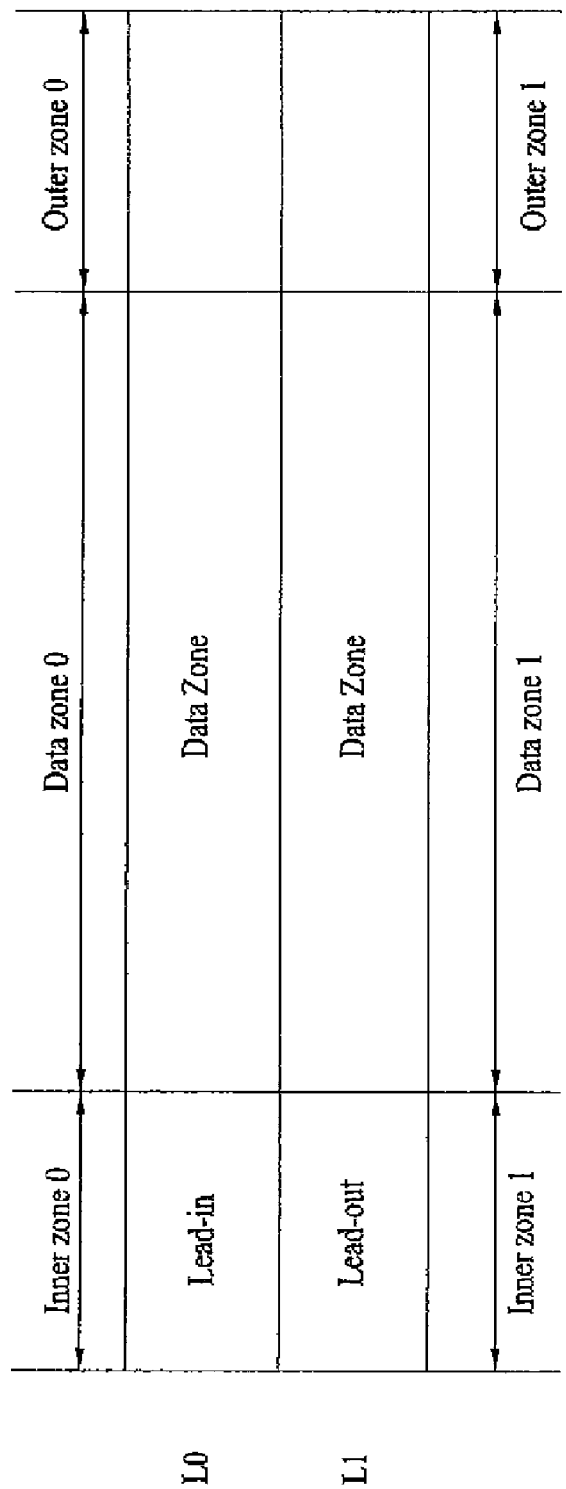
FIG. 2 is a diagram of a recording medium according to one embodiment of the present invention.

FIG. 2 is a diagram of a recording medium according to one embodiment of the present invention, in which a structure of a recordable dual-layer blu-ray disc is schematically shown.

Referring to FIG. 2, each recoding layer in a recording medium is comprised of an inner zone, a data zone, and an outer zone. Each of the inner and outer zones includes a power test area and a management area.

The data zone includes a user data zone for recording user data and a spare area for defect management. And, the spare area includes an inner spare area (ISA) and an outer spare area (OSA). Yet, the spare area is optionally allocated.

Figure 3:
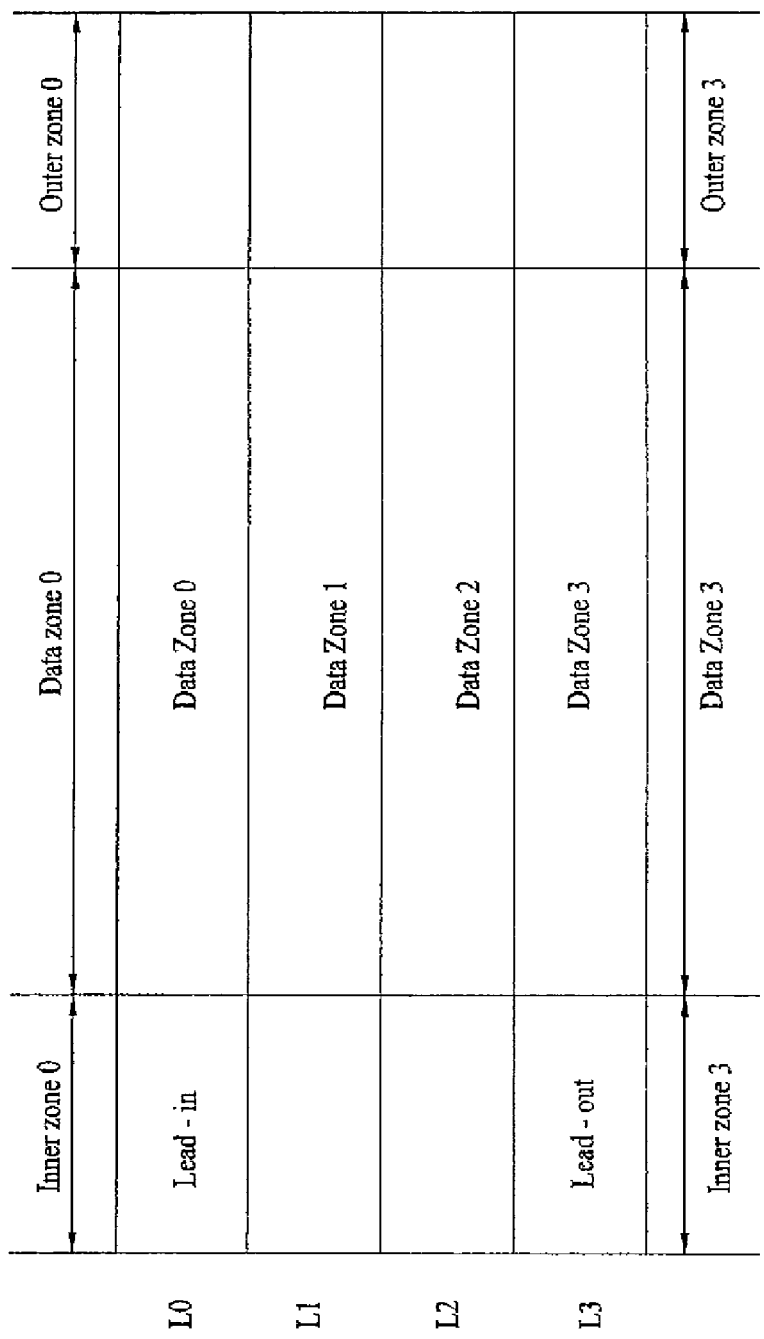
FIG. 3 is a diagram of a recording medium according to one embodiment of the present invention.

FIG. 3 is a diagram of a recording medium according to one embodiment of the present invention, in which a structure of a recordable multi-layer blu-ray disc is schematically shown.

Referring to FIG. 3, four recording layers are provided within a recording medium. Alternatively, the present invention is applicable to a recording medium having n-recording layers as well.

The respective recording layers in the disc of the present invention are sequentially called a $0^{th}$ recording layer (layer 0: hereinafter called L0), a first recording layer (layer 1: hereinafter called L1), a second recording layer (layer 2: hereinafter called L2), a third recording layer (layer 3: hereinafter called L3), . . . and an nth recording layer (layer n: hereinafter called Ln) in order of distance from an incident direction of an optical beam. In the present embodiment, the disc is provided with four recording layers L0, L1, L2 and L3. As mentioned in the description of FIG. 2, the respective recording layers may be arranged in order of distance closer to an optical beam.

And, it is apparent to those skilled in the art that the present invention is not restricted by the order of the recording layer arrangement. Besides, the description of the embodiment shown in FIG. 2 is applicable to the distinction and naming of the inner, data and outer zones.

Figure 4:
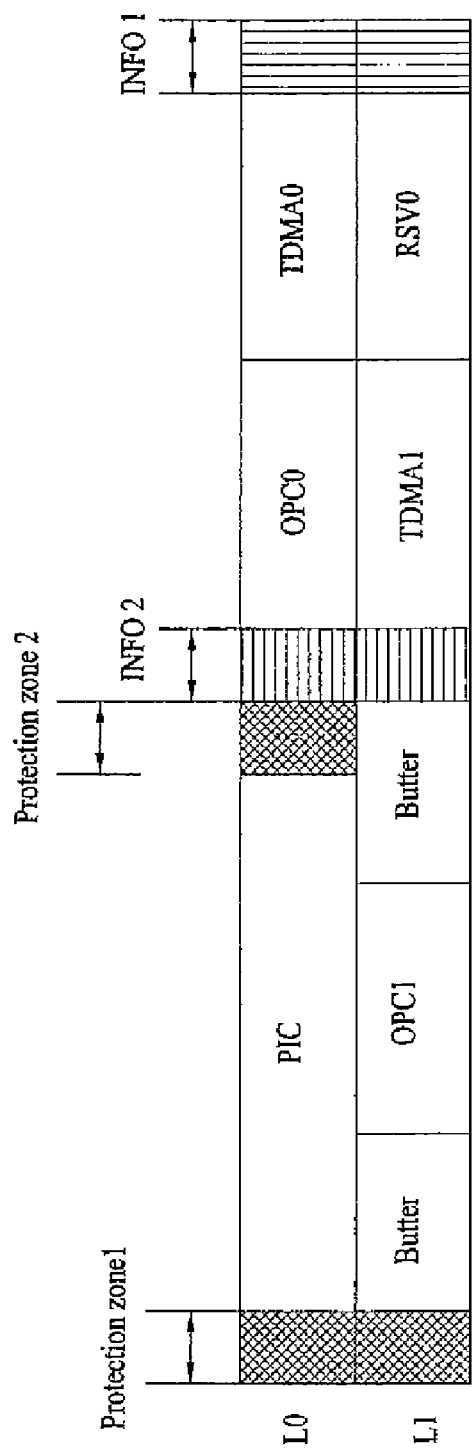
FIG. 4 is a diagram of an inner zone of a recording medium according to one embodiment of the present invention.

FIG. 4 is a diagram of an inner zone of a recording medium according to one embodiment of the present invention. In particular, an inner zone shown in FIG. 4 corresponds to an inner zone in a dual-layer recording medium. To provide strong stability to a dual-layer recording medium, TDMA and an OPC zone are not located at the physically same place with reference to a propagating direction of an optical beam.

Referring to FIG. 4, an inner zone of L0 includes a first protection zone (protection zone 1), a PIC zone, a second protection zone (protection zone 2), a second INFO zone (INFO2), an OPC0 zone, a TDMA0, and a first INFO zone (INFO1), from an inner circumference of a recoding medium. And, a specific size may be allocated to each of the respective zones.

For example, the second protection zone includes 223 clusters, the second INFO zone includes 156 clusters, the OPC0 zone includes 2,048 clusters, the TDMA0 zone includes 256 clusters, the OPC0 zone includes 2,048 clusters, the TDMA0 zone includes 2,048 clusters, and the first INFO zone (INFO1) includes 256 clusters.

An inner zone of L1 includes a first protection zone (protection zone 1), a buffer, an OPC1 zone, a buffer, a second INFO zone (INFO2), a TDMA1, a $0^{th}$ reserved zone (Reserved0: Rsv0), and a first INFO zone (INFO1), from an inner circumference of a disc. And, a predetermined size may be allocated to a specific zone of the L1.

For example, a size of a specific zone provided to the inner zone of the L1 may be allocated in a following manner. The buffer includes 1,547 clusters, the OPC1 zone includes 1,547 clusters, the buffer includes 1,770 clusters, the second INFO zone (INFO2) includes 256 clusters, the TDMA1 includes 2,048 clusters, the reserved zone 0 (Reserved0: Rsv0) includes 2,048 clusters, and the first INFO zone (INFO1) includes 256 clusters.

The respective zones shown in FIG. 4 are explained in detail as follows.

First of all, in the PIC zone shown in FIG. 4, recording medium management information is recorded as an embossed HDM (high frequency modulated) signal. And, various kinds of recording medium management informations such as DMA (disc management area) and the like are recorded in the INFO zones (INFO1, INFO2).

TDMA is a temporary disc management area and is included in a BD-R that is a once-recordable recording medium among blu-ray discs. The TDMA may be arranged in the vicinity of the OPC zone of a recording medium. For reference, in case of a re-writable blu-ray disc (BD-RE), the zone in the vicinity of the OPC zone remains as a reserved area for later use.

The TDMA is the area used in updating defect management and recording management information of a recording medium, while the recording medium is used. In case of a single-layer blu-ray recording medium (not shown in the drawing), TDMA0 having a fixed size is included in an inner circumference area. In case of a dual-layer blu-ray disc, TDMA0 having a fixed size may be included in an inner circumference area of a recording layer 0 and TDMA1 having a fixed size may be included in an outer circumference area of a recording layer 1. For more updates of the defect and recording management information, additional TDMAs may be defined in the recording medium.

Each of the TDMAs includes information indicating recorded statuses of a temporary disc definition structure (TDDS), a temporary defect list (TDFL) and a data zone. According to a recording mode, sequential recording range information (SRRI) is recorded as the information indicating the recorded status in the TDMA in case of a sequential recording mode. Space bit maps (SBM) is recorded as the information indicating the recorded status in the TDMA in case of a random recording mode.

The temporary disc definition structure (TDDS) includes information for a format and status of a recording medium such as a size of a spare zone, a size of the TDMA and the like. The temporary defect list includes information for a defect state of a recording medium that is being used, information for a substitute cluster and the like.

In case of a recording medium that is not closed, the optical recording/reproducing apparatus 10 reproduces data from the recording medium or records data on the recording medium using information recorded in the TDMA. So, the read-out of the information recorded in the TDMA is important for recording/reproduction of the data.

The inner circumference area of the recording medium shown in FIG. 4 includes a plurality of protection zones (protection zone1, protection zone2). In particular, the second protection zone (protection zone1) is a sort of a buffer zone utilized as a changing section from an embossed HFM zone into a recordable zone.

In the once-recordable blu-ray disc (BD-R) of the present invention, data is recorded on a groove of a recording layer having a land and a groove included in the disc. And, the groove includes an HFM modulated grove and a wobbled groove. In particular, the wobbled groove configures a wobbled shape in the groove of the recording layer by modulation using a sinusoid. The optical recording/reproducing apparatus 10 calculates address information of a corresponding groove (called address in pre-groove (ADIP)) and disc general information through the wobbled shape.

Figure 5:
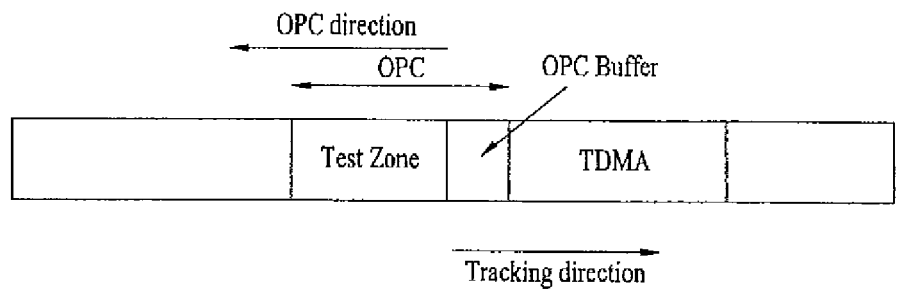
FIG. 5 is a diagram of a power test zone and a management area in a recording medium according to one embodiment of the present invention.

FIG. 5 is a diagram of a power test area and a management area in a recording medium according to one embodiment of the present invention, in which the arrangements of the OPC zone and TDMA are based on the OPC zone and TDMA of L0 of the recording medium shown in FIG. 4.

In this case, the OPC zone includes a test zone for substantially performing a test and an OPC buffer for preventing adjacent TDAM from being affected by the test performance in the test zone. The OPC buffer may be named 'test area buffer' as well. The arrangements of the OPC zone and TDMA shown in FIG. 5 are not limited to a dual-layer. And, it is apparent to those skilled in the art that the arrangements are applicable to a recording layer adjacent to the TDMA and OPC zone.

In case of the L1 shown in FIG. 4, the OPC buffer may not be used. This is because a buffer zone, in which data is not recorded, exists in the vicinity of the OPC1 zone. The buffer zone enables the second INFO zone (IN2) from being damaged by degradation generated from the test performed in the OPC1 zone. As shall be mentioned in the description of FIG. 5, since the OPC1 zone is used for the test from a cluster distant from the second INFO zone (IN2), it may be said that the data in the second INFO zone (INFO2) is damaged by the OPC execution less than that in the TDMA0.

An OPC proceeding direction and a general tracking process for reading data from a recording medium are shown in FIG. 5. In case of tracking, it proceeds in a direction that a physical sector number (PSN) is incremented. A tracking direction is represented in FIG. 5. On the other hand, the OPC process proceeds in a direction that a physical sector number (PSN) is incremented. Namely, after completion of executing the OPC process, the data recording on the recording medium may be executed in a direction that the physical sector number is incremented.

Since the OPC zone is used in reverse order of the physical sector number, a cluster closest to the TDMA is used for a power test for OPC in the OPC zone. In order to read data recorded on a recording medium, the optical recording/reproducing apparatus 10 according to the present invention performs tracking for moving the pickup 11 along with tracks on which the data is recorded. In this case, instead of accurately starting from a recording start position of data to be read, the tracking may start from an advanced position. Since a disc is being rotated, it may be difficult to start the tracking from the accurate recording start position of data. So, to read the data correctly, a servo operation is carried out before the recording position of the data is reached. Optionally, a size of the OPC buffer may be decided in proportion to a speed of the recording medium.

Figure 6A:
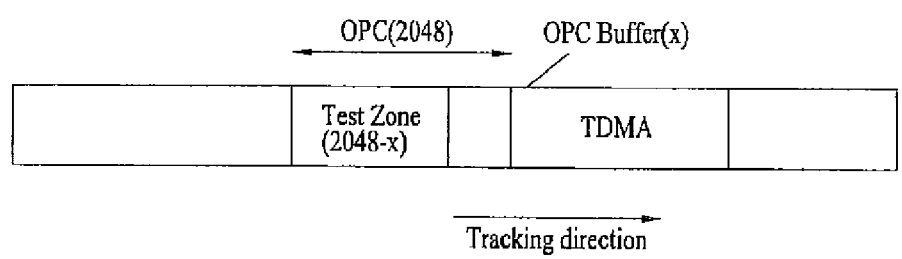
FIG. 6A is a diagram of a power test area and a management area in a recording medium according to one embodiment of the present invention.

FIG. 6A is a diagram of arrangements of an OPC zone and TDMA in correspondence to a size of the OPC zone. A predetermined size may be allocated to a whole OPC zone. For example, 2,048 clusters, as shown in FIG. 6A, may be allocated to the OPC zone. In this case, a size of an OPC buffer may be set to x-clusters and a size of a text zone for carrying out an actual power test becomes (2,048−x) clusters. In this case, 'x' may be a natural number equal to or greater than 1. According to a type of a recording medium and the number of layers in the recording medium, a size of the 'x' may be limited to a predetermined size. For example, the size of 'x' may be limited to '4'. For more stable power test, it is able to allocate a size of the 'x' sufficiently. For example, it is able to set the size of 'x' to a number equal to or greater than 5.

Figure 6B:
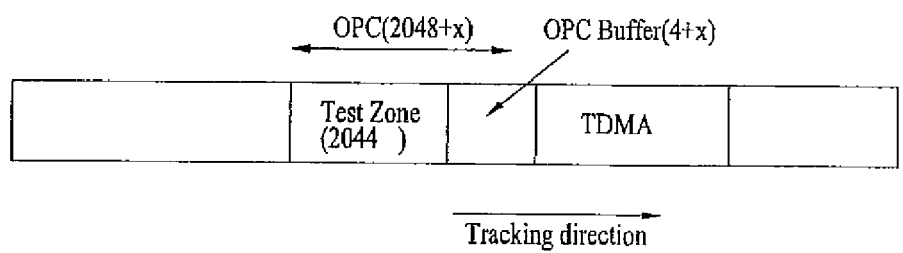
FIG. 6B is a diagram of a power test area and a management area in a recording medium according to one embodiment of the present invention.

FIG. 6B is a diagram of arrangements of an OPC zone and TDMA in correspondence to a size of the OPC zone. A size of a whole OPC zone may be set to vary according to a size of an OPC buffer. If a size of the OPC buffer is set to (4+x), it is able to set a size of the whole OPC zone to (2,048+x). In this case, there is no loss in the size of the OPC zone and a size of the OPC buffer for a stable test may be secured. Yet, a size of an adjacent zone becomes changed.

Figure 7:
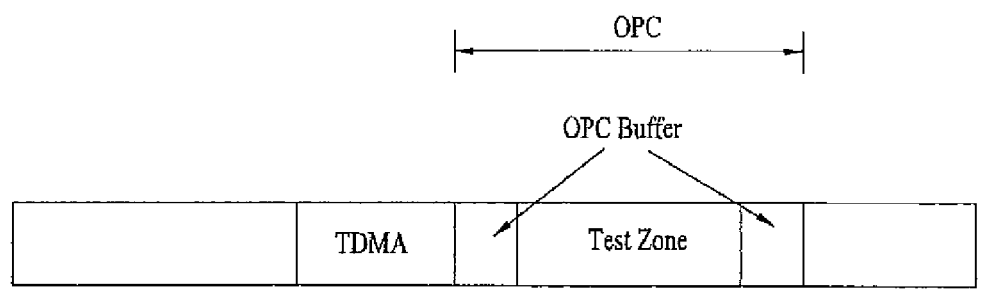
FIG. 7 is a diagram of a power test area and a management area in a recording medium according to one embodiment of the present invention.

FIG. 7 is a diagram of a structure of a recording medium and a stable tracking method according to another embodiment of the present invention, in which an OPC zone is allocated to sectors having physical sector numbers greater than those of TDMA.

Referring to FIG. 7, if positions of an OPC zone and TDMA are switched in reverse to those shown in FIG. 5A, FIG. 6A and FIG. 6B, sectors configuring the OPC zone have physical sector numbers higher than those configuring the TDMA. The OPC zone further includes a buffer size having greater than 4-physical cluster, between the TDMA and a test zone for example. Like the former OPC buffer shown in FIG. 5, an OPC buffer shown in FIG. 7 plays a role in preventing other zones from being affected by the degradation due to the OPC execution and the like.

Of course, it is apparent that the OPC buffer of the present invention is applicable to a single-layer recording medium as well.

Figure 8:
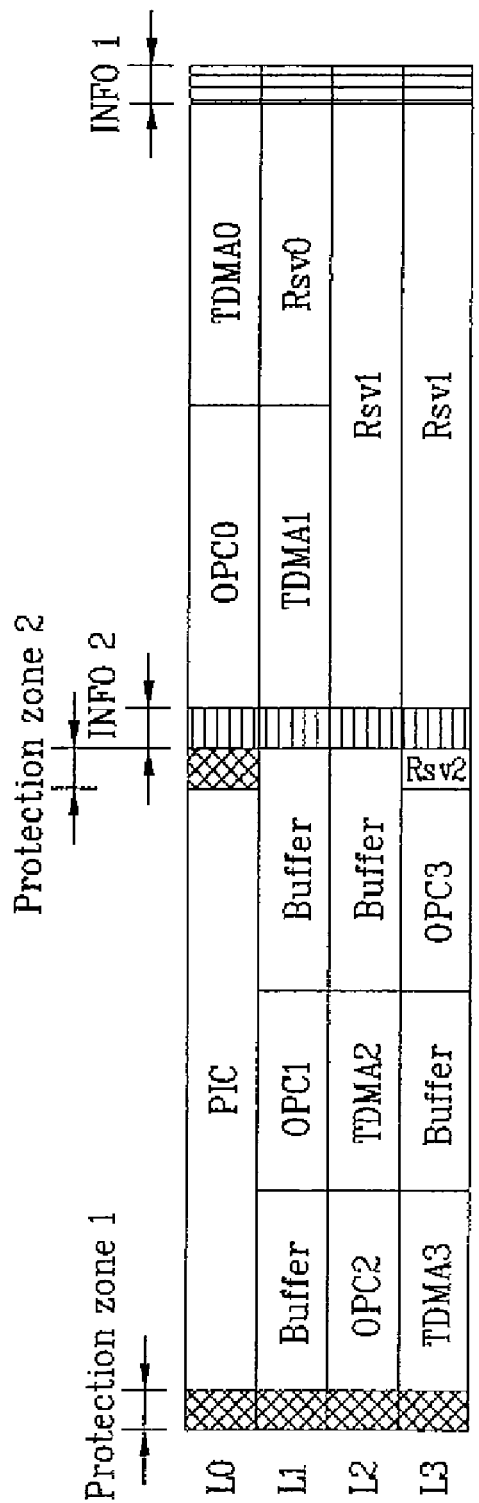
FIG. 8 is a diagram of an inner zone of a recording medium according to one embodiment of the present invention.

FIG. 8 is a diagram of an inner zone of a recording medium according to one embodiment of the present invention. In the embodiment shown in FIG. 8, in order for a recording medium to be provided with a structure having strong stability, TDMA and an OPC zone are not provided to the physically same location with reference to a propagating direction of an optical beam. For a multi-layer recording medium shown in FIG. 8, more various embodiments are possible.

An inner zone of L2 includes a first protection zone (protection zone1), an OPC2 zone, a TDMA2, a buffer, a second INFO zone (INFO2), a first reserved zone (Reserved1: Rsv1), and a first INFO zone (INFO1), from an inner circumference of a disc. And, it is able to allocate a size to a specific zone of the L2 included in the inner zone. For example, 1,547 clusters are allocated to the OPC2 zone, 1,547 clusters are allocated to the TDMA2, 1,770 clusters are allocated to the buffer, 256 clusters are allocated to the second INFO zone (INFO2), 4,096 clusters are allocated to the first reserved zone (Reserved1. Rsv1), and 256 clusters are allocated to the first INFO zone (INFO1).

An inner zone of L3 includes a first protection zone (protection zone1), a TDMA3, a buffer, an OPC3 zone, a second reserved zone (Reserved2: Rsv2), a second INFO zone (INFO2), a first reserved zone (Reserved1: Rsv1), and a first INFO zone (INFO1), from the inner circumference of the disc. And, it is able to allocate a size to a specific zone of the L3 included in the inner zone. For example, 1,547 clusters are allocated to the TDMA3, 1,547 clusters are allocated to the buffer, 1,547 clusters are allocated to the OPC3 zone, 256 clusters are allocated to the second INFO zone (INFO2), 4,096 clusters are allocated to the first reserved zone (Reserved1: Rsv1), and 256 clusters are allocated to the first INFO zone INFO1).

Figure 9:
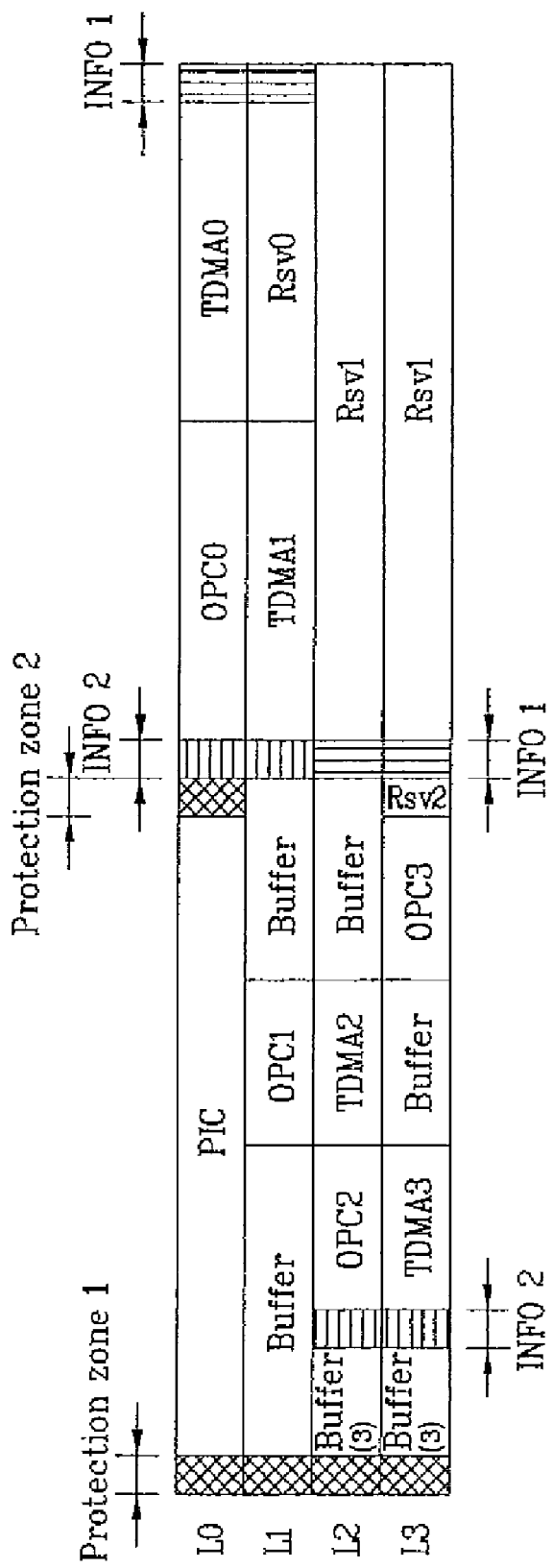
FIG. 9 is a diagram of an inner zone of a recording medium according to one embodiment of the present invention.

In the embodiment shown in FIG. 9, like the embodiment shown in FIG. 8, in order for a recording medium having a plurality of recording layers to secure data stability, TDMA and an OPC zone are not provided to the physically same location with reference to a propagating direction of an optical beam. Yet, the arrangements of INFO zones may be varied. In particular, first and second INFO zones (INFO1 and INFO2) of L0 are located at the physically same positions of first and second INFO zones INFO1 and INFO2 of L1. And, first and second INFO zones (INFO1 and INFO2) of L2 are located at the physically same positions of first and second INFO zones INFO1 and INFO2 of L3. Yet, it only differs in that the first and second INFO zones (INFO1 and INFO2) of L0 and L1 are not located at the physically same positions of the first and second INFO zones (INFO1 and INFO2) of L2 and L3. Moreover, a size of each zone may differ from that shown in FIG. 6A or FIG. 6B.

L0 and L1 shown in FIG. 9 are equal to those shown in FIG. 7 and are able to refer to the description of FIG. 4. An inner zone of L2 includes a first protection zone (protection zone1), a buffer (3), a second INFO zone (INFO2), an OPC2 zone, a TDMA2, a buffer, a first INFO zone (INFO1), and a first reserved zone (Reserved1: Rsv1), from an inner circumference of a disc. An inner zone of L3 includes a first protection zone (protection zone1), a buffer, a second INFO zone (INFO2), a TDMA3, a buffer, an OPC3 zone, a second reserved zone (Reserved2: Rsv2), a first INFO zone (INFO1), and a first reserved zone (Reserved1: Rsv1), from an inner circumference of the disc.

A method of allocating a size of zone configuring each recording layer is explained with reference to FIG. 9 as follows. Sizes of the respective zones in L0 and L1 may refer to the description of FIG. 8. For the sizes of the zones configuring the L2 or L3, 2,048 clusters may be provided to a OPC0 zone, a TDMA0, a TDMA1, and a $0^{th}$ reserved zone (Reserved0: Rsv0). A size of the buffer (3) provided to the inner zone of L2 may be set to X-clusters. A size of the second reserved zone (Reserved2: Rsv2) provided to the inner zone of L3 may be set to 233 clusters. A size of the OPC1 zone, the OPC2 zone, the OPC3 zone, the TDMA2 and the TDMA3 may be set to Y-clusters. The 'Y' may be calculated by Formula 1. In this case, 'X' may be set to a value that makes the 'Y' an integer.

$$Y=(4864-223-X)/Y \qquad \text{[Formula 1]}$$

Thus, by arranging the second INFO zones (INFO2) of the L0 and L1 and the first INFO zones (INFO1) of the L2 and L3 at the physically same positions, it is able to reduce the possibility of data loss. Preferably, in case of a multi-layer disc (e.g., 4-layer disc), the recording medium according to the present invention is adopted for the data stability.

In case of L2, the OPC zone (OPC2) and the TDMA (TDMA2) are adjacent to each other. In this case, the OPC buffer, as shown in FIGS. 5 to 7, may be allocated to enhance the stability of the recording medium.

The INFO zones of the respective recording layers, as shown in FIG. 9, are not located at the same position. In the embodiment shown in FIG. 9, L0 and L1 have the INFO zones allocated at the same positions and L2 and L3 have the INFO zones allocated at the same positions. Yet, it is observed that the position of the INFO zones of the L0 and the L1 differ from those of the L2 and the L3. This is to enhance data stability in performing recording/reproduction of the recording medium.

Namely, in a recording medium including a plurality of recording layers, INFO zones of layer-N and layer-(N+1) have the same arrangements and INFO zones of layer-(N+2) and layer-(N+3) have the same arrangements. Yet, the arrangements of the former two layers may differ from those of the latter two layers. Moreover, it is apparent that there are various embodiments that INFO zones of the respective layers may be located at the different positions.

A structure of an outer area of a recording medium having a plurality of recording layers is explained with reference to FIGS. 10 to 13B as follows. In particular, a recording medium having four recording layers is mainly explained in the following description. And, the present invention is further applicable to a recording medium having at least two recording layers.

FIG. 10 is a diagram of an outer zone of a recording medium according to one embodiment of the present invention.

Referring to FIG. 10, in order for a recording medium having a plurality of recording layers to secure a structure of high stability, INFO zones of the respective recording layers are not located at the same positions. In particular, third and fourth INFO zones (INFO3, INFO4) in outer zones of L0 and L1 are provided to the physically same positions with reference to a propagating direction of an optical beam. And, third and fourth INFO zones (INFO3, INFO4) in outer zones of L2 and L3 are provided to the physically same positions with reference to a propagating direction of an optical beam. Yet, the third and fourth INFO zones (INFO3, INFO4) of L0 and L1 are not located at the physically same positions of the third and fourth INFO zones (INFO3, INFO4) in outer zones of L2 and L3.

In more particular, the outer zone of L0 includes a third INFO zone (INFO3), an angular buffer, a fourth INFO zone (INFO4), a DCZ0 zone, and a protection zone, from an inner circumference of the recording medium. The outer zone of L1 includes a third INFO zone (INFO3), an angular buffer, a fourth INFO zone (INFO4), a DCZ1 zone, and a protection zone, from an inner circumference of the recording medium. The outer zone of L2 includes a DCZ2 zone, a third INFO zone (INFO3), an angular buffer, a fourth INFO zone (INFO4), and a protection zone, from an inner circumference of the recording medium. And, the outer zone of L3 includes a DCZS3 zone, a third INFO zone (INFO3), an angular buffer, a fourth INFO zone (INFO4), and a protection zone, from an inner circumference of the recording medium. As mentioned in the foregoing description, it is able to perform a power test in the DCZ zone of the outer zone to find an optimum power.

Each of the zones included in the outer zone may be allocated with a specific size. For example, except the protection zone, the outer zone of each of the layers may have a size of 780 clusters. Looking into the sizes of the specific zones included in the outer zone, each of the third and fourth INFO zones (INFO3, INFO4) includes 96 clusters, the angular buffer includes 76 clusters, and each of the DCZ0 zone, the DCZ1 zone, the DCZ2 zone and the DCZ3 zone includes 513 clusters. In this case, the third and fourth INFO zones (INFO3, INFO4) of L0 and L1 are not located at the physically same positions of the third and fourth INFO zones (INFO3, INFO4) of L2 and L3.

Compared to FIG. 10, FIG. 11 is characterized in providing reserved zones to outer zones of L2 and L3 in a direction of an inner circumference. Hence, a size of a DCZ2 zone or a DCZ3 zone is reduced by a size of the reserved zone. For example, a size of the reserved zone is set to 268 clusters and a size of the DCZ2 or DCZ3 zone is set to 244 clusters. In the embodiment shown in FIG. 11, in case that OPC is performed in the DCZ2/DCZ3 zone, it is able to prevent damage of the data recorded in the INFO zone (INFO3/INFO4) of L0/L1.

In FIGS. 12A to 13B, 'X-area' means the zone that covers all of a third INFO zone (INFO3), an angular buffer, and a fourth INFO zone INFO4).

Figure 12A:
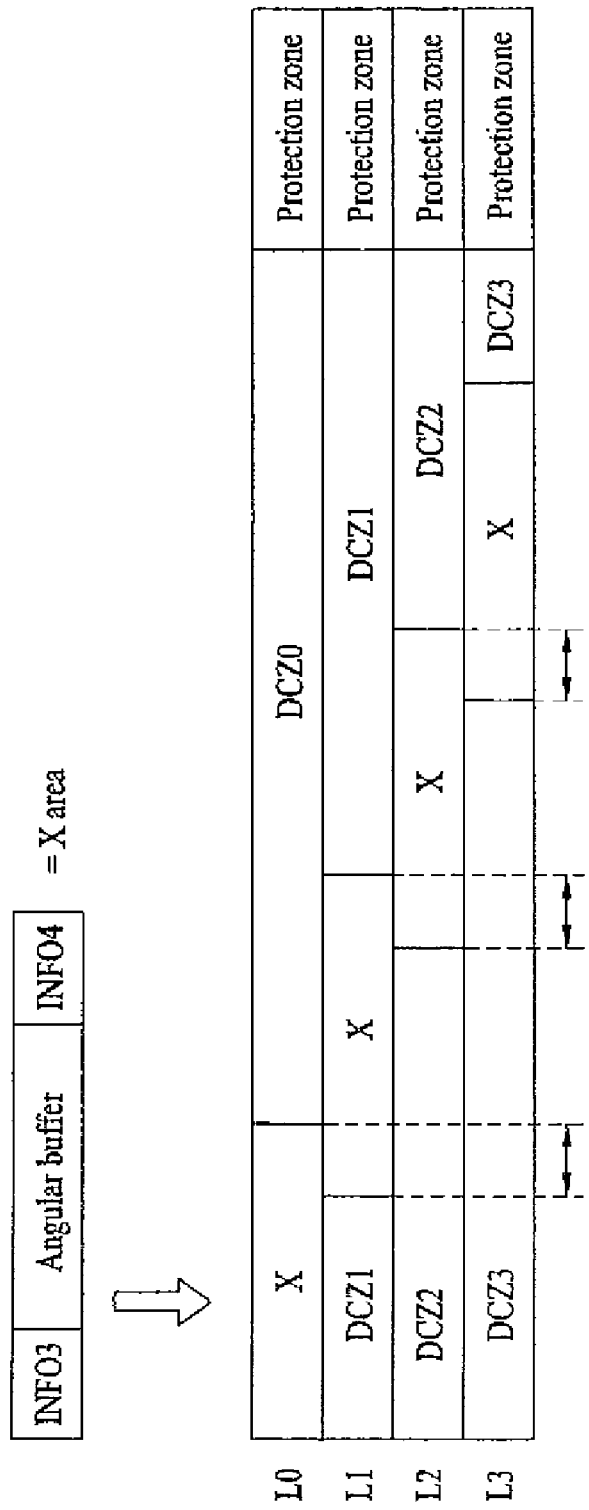
FIG. 12A and FIG. 12B are diagrams of an outer zone of a recording medium according to one embodiment of the present invention.
Figure 12B:
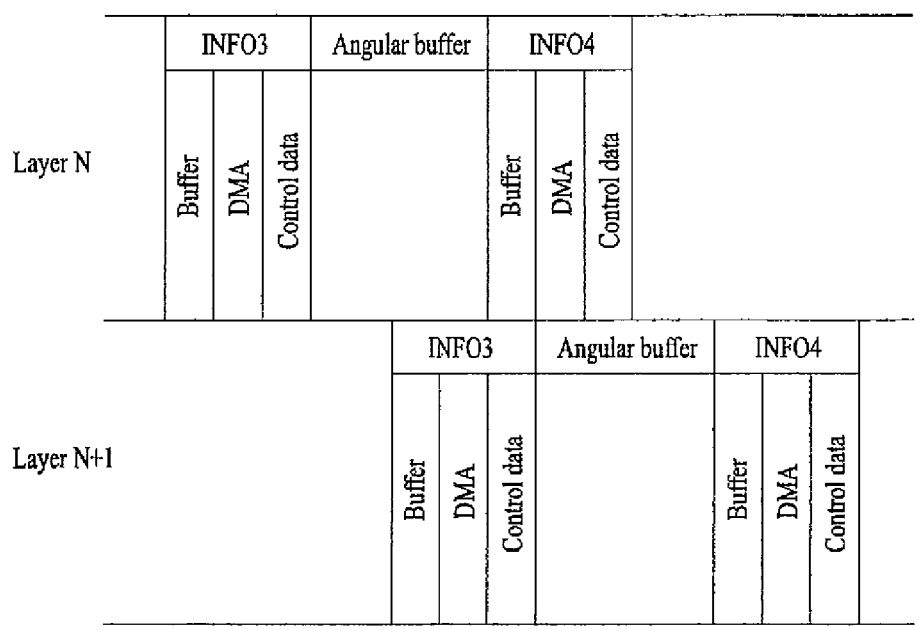

FIG. 12A and FIG. 12B are diagrams of an outer zone of a recording medium according to one embodiment of the present invention.

Referring to FIG. 12A, in order for a recording medium having a plurality of recording layers to be provided with a structure having strong stability, an X-area is arranged to be overlapped in part between two adjacent recording layers among a plurality of the recording layers. The recording medium according to the present invention configures an outer zone to have the X-area to be overlapped in part between the adjacent recording layers but prescribed zones including important data in third and fourth INFO zones (INFO3, INFO4) are not overlapped per recording layer.

Referring to FIG. 12B, each of third and fourth INFO zones (INFO3, INFO4) includes a buffer, a DMA, and a control data zone (CONTROL DATA). The overlapped part between a layer-N and a layer-(N+1) corresponds to a portion of the angular buffer of the layer-N, the fourth INFO zone (INFO4) of the layer-N, a portion of the angular buffer of the layer-(N+1), and the third INFO zone (INFO3) of the layer-(N+1). In this case, the DMA and the control data including important data in the layer-N are provided to the same position of the portion of the angular buffer in the layer-(N+1) with reference to a propagating direction of an optical beam. And, the DMA and the control data including important data in the layer-(N+1) are provided to the same positions of the portion of the angular buffer in the layer-N and the buffer of the fourth INFO zone (INFO4) with reference to a propagating direction of an optical beam. Although a problem is generated from a specific position of the recording medium, a quantity of data loss in the recording medium having a plurality of the recording layers is not considerable. Hence, it is able to provide the recording medium with stable characteristics.

Figure 13A:
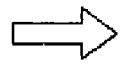
FIG. 13A and FIG. 13B are diagrams of an outer zone of a recording medium according to one embodiment of the present invention.
Figure 13B:
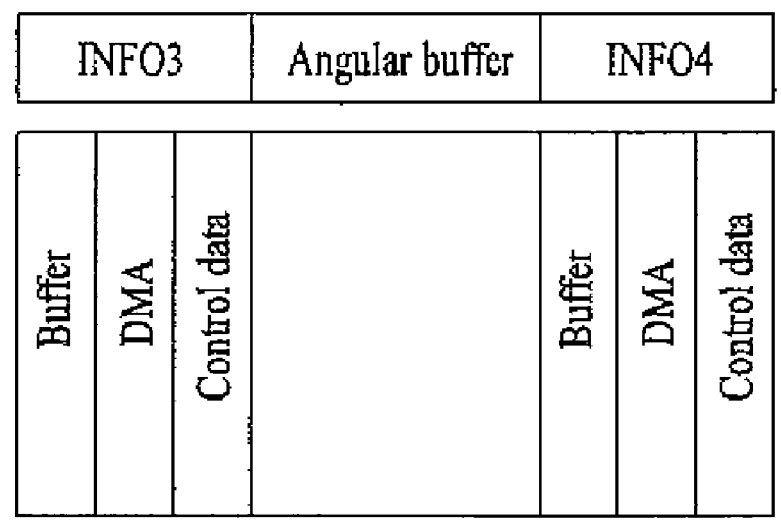

FIG. 13A and FIG. 13B are diagrams of an outer zone of a recording medium according to one embodiment of the present invention.

Referring to FIG. 13A, in order for a recording medium having a plurality of recording layers to be provided with a structure having strong stability, X-areas are not provided to the physically same positions between adjacent recording layers among a plurality of the recording layers with reference to a propagating direction of an optical beam.

Arrangements of an X-area in an outer zone and zones included in the X-area are explained with reference to FIG. 13B as follows. For example, it is assumed that total cluster size of the X-area in the outer zone and the DCZ zone is 780 clusters. In this case, a third INFO zone (INFO3) includes a 16-cluster buffer, a 32-cluster DMA, and a 32-cluster control data zone (CONTROL DATA). An angular buffer has a 35-cluster size. And, a fourth INFO zone (INFO4) includes a 32-cluster DMA, a 32-cluster control data zone (CONTROL DATA), and a 16-cluster buffer. Since a size of the X-area becomes 195 clusters, X-areas of four recording layers L0, L1, L2 and L3 are not provided to the physically same positions. The size of each of the zones in FIG. 6B is just exemplary but may be modified.

Accordingly, the present invention enables a stable power test and recording, thereby protecting data of a recording medium.

It will be apparent to those skilled in the art that various modifications and variations may be made in the present invention without departing from the spirit or scope of the inventions. Thus, it is intended that the present invention covers the modifications and variations of this invention provided they come within the scope of the appended claims and their equivalents.

What is claimed is:

1. A recording medium including at least three recording layers, each of the recording layers including an inner area, a data area, and an outer area, the medium comprising:
    the inner area of each recording layer including at least one of a test area and a temporary disc management area, all test areas in the inner area of each recording layer being located at a different position with respect to an incident beam; and
    the inner area of the each recording layer including a first INFO zone and a second INFO zone, and all second INFO zones being located at the same position with respect to the incident beam,
    wherein the at least one temporary disc management area is configured to be used until the recording medium is to be finalized,
    the inner area of N-th recording layer further includes a PIC area or a buffer area, and the PIC area or the buffer area in the inner area of N-th recording layer is located at a same position partially or entirely, respectively, as the test area in the inner area of N+1-th recording layer with respect to the incident beam, and
    the temporary disc management area in the inner area of N+2-th recording layer is located at a same position as the test area in the inner area of N+1-th recording layer with respect to the incident beam.

2. The recording medium of claim 1, wherein the first and second INFO zones include at least one disc management area, and the at least one disc management area is used when the recording medium is to be finalized.

3. The recording medium of claim 2, wherein the test area includes a test area buffer, which is allocated with a size enabling tracking of the management area of the recording medium to start from the test area buffer.

4. The recording medium of claim 3, wherein the size of the test area buffer is allocated in proportion to a recording speed.

5. The recording medium of claim 3, wherein the test area buffer is allocated with a size more than 4 physical clusters.

6. The recording medium of claim 1, wherein the test area includes a fixed number of physical clusters and a test zone including resulting physical clusters resulting from subtracting the physical clusters configuring the test area buffer from the fixed number of the physical clusters.

7. A method of recording data on a recording medium, which includes at least three recording layers, each of the recording layers including an inner area, a data area, and an outer area, the inner area including at least one test area and at least one temporary disc management area, the method comprising the steps of:
    reading position information from the at least one temporary disc management area, the position information indicating an available position in the at least one test area among all test areas included in the at least three recording layers, wherein each of all test areas is located at a different position from each other, and the at least one temporary disc management area included in a N+2-th recording layer of the at least three recording layers and the test area included in a N+1-th recording layer of the at least three recording layers overlap with each other;
    performing an Optimum Power Control (OPC) process on the read available position for determining an optimum write power in the read available position of the at least one test area, wherein the at least one test area included in a N+1-th recording layer and either a PIC area or a buffer area included in the inner area of a N-th recording layer overlap with each other partially or entirely; and recording a data using the determined optimum write power, wherein the at least one temporary disc management area is used for managing a defect until the recording medium is to be finalized.

8. The method of claim 7, wherein the inner area of each recording layer includes a first INFO zone and a second INFO zone, all second INFO zones are located at the same position with respect to the incident beam, and the first and second INFO zones include at least one disc management area, and the at least one disc management area is used when the recording medium is to be finalized.

9. The method of claim 7, wherein the inner area of each recording layer includes a first INFO zone and a second INFO zone, all second INFO zones are located at the same position with respect to the incident beam, and the all first INFO zones are located at a same position with respect to the incident beam.

10. An apparatus for recording data on a recording medium, which includes at least three recording layers, each of the recording layers including an inner area, a data area, and an outer area, the inner area including at least one test area and at least one temporary disc management area, the apparatus comprising:

a pickup configured to read a data from the recording medium or to record a data on the recording medium; and a controller configured to control the pickup to read position information from the at least one temporary disc management area, the position information indicating an available position in the at least one test area among all test areas included in the at least three recording layers, configured to control the pickup to perform an Optimum Power Control (OPC) process on the read available position for determining an optimum write power in the read available position of the at least one test area, the at least one test area included in a N+1-th recording layer and either a PIC area or a buffer area included in the inner area of a N-th recording layer overlap with each other partially or entirely, and configured to control the pickup to record a data using the determined optimum write power, wherein each of all test areas is located at a different position from each other, the at least one temporary disc management area is used for managing a defect until the recording medium is to be finalized, and the at least one temporary disc management area included in a N+2-th recording layer of the at least three recording layers and the test area included in a N+1-th recording layer of the at least three recording layers overlap with each other.

11. The apparatus of claim 10, wherein the inner area of each recording layer includes a first INFO zone and a second INFO zone, all second INFO zones are located at the same position with respect to the incident beam, and the first and second INFO zones include at least one disc management area, and the at least one disc management area is used when the recording medium is to be finalized.

12. The apparatus of claim 10, wherein the inner area of each recording layer includes a first INFO zone and a second INFO zone, all second INFO zones are located at the same position with respect to the incident beam, and the all first INFO zones are located at a same position with respect to the incident beam.

* * * * *